US012722422B2

(12) United States Patent
Hedley et al.

(10) Patent No.: US 12,722,422 B2
(45) Date of Patent: Sep. 1, 2026

(54) METHOD AND APPARATUS FOR HANDLING COMPONENTS OF A VEHICLE WHEEL ASSEMBLY

(71) Applicant: Justoy Pty Limited, New South Wales (AU)

(72) Inventors: Robert Ian Hedley, New South Wales (AU); Andrew Keith, New South Wales (AU)

(73) Assignee: Justoy Pty Limited, New South Wales (AU)

( * ) Notice: Subject to any disclaimer, the term of this patent is extended or adjusted under 35 U.S.C. 154(b) by 508 days.

(21) Appl. No.: 18/276,498

(22) PCT Filed: Feb. 8, 2022

(86) PCT No.: PCT/AU2022/050067
§ 371 (c)(1),
(2) Date: Aug. 9, 2023

(87) PCT Pub. No.: WO2022/170382
PCT Pub. Date: Aug. 18, 2022

(65) Prior Publication Data

US 2024/0109368 A1 Apr. 4, 2024

(30) Foreign Application Priority Data

Feb. 9, 2021 (AU) ................................ 2021900304

(51) Int. Cl.
*B60B 30/06* (2006.01)
*B60B 30/10* (2006.01)

(52) U.S. Cl.
CPC .............. *B60B 30/06* (2013.01); *B60B 30/10* (2013.01); *B60B 2340/36* (2013.01)

(58) Field of Classification Search
CPC ..... B60B 29/002; B60B 29/001; B60B 30/06; B60B 30/10; B60B 2340/36; B60B 2340/52; B60B 2900/3313
(Continued)

(56) References Cited

U.S. PATENT DOCUMENTS

| | | | | |
|---|---|---|---|---|
| 3,970,342 A * | 7/1976 | Cotton | .................... | B66F 9/183 294/119.2 |
| 8,459,926 B2 * | 6/2013 | Hedley | ................. | B60B 29/002 414/429 |

(Continued)

FOREIGN PATENT DOCUMENTS

| | | |
|---|---|---|
| FR | 2700301 | 7/1994 |

OTHER PUBLICATIONS

International Preliminary Report on Patentability Dated Jan. 16, 2023 From the International Preliminary Examining Authority Re. Application No. PCT/AU2022/050067. (4 Pages).

(Continued)

*Primary Examiner* — Hadi Shakeri

(57) ABSTRACT

An apparatus (10) for the installation/removal of a vehicular component (112), such as a wheel adaptor/spacer. The apparatus (10) includes a support structure (20) and a mounting head (40). The support structure (20) is height adjustable. The mounting head (40) includes an arm assembly (41) which is longitudinally extendable, and, which is rotatably connected to the support structure (20). Mounting brackets (48, 49) are attached to each end of the arm assembly (41) which are adapted to releasably engage the vehicular component (112).

18 Claims, 13 Drawing Sheets

(58) Field of Classification Search
USPC .............................................................. 157/14
See application file for complete search history.

(56) References Cited

U.S. PATENT DOCUMENTS

| | | | | |
|---|---|---|---|---|
| 9,132,696 | B2 * | 9/2015 | Grengs | B60B 30/02 |
| 2005/0016663 | A1 | 1/2005 | Lockridge et al. | |
| 2014/0138502 | A1 | 5/2014 | Hall | |
| 2015/0151576 | A1 | 6/2015 | Grengs | |

OTHER PUBLICATIONS

International Search Report and the Written Opinion Dated Apr. 1, 2022 From the International Searching Authority Re. Application No. PCT/AU2022/050067. (10 Pages).

* cited by examiner

METHOD AND APPARATUS FOR HANDLING COMPONENTS OF A VEHICLE WHEEL ASSEMBLY

RELATED APPLICATIONS

This application is a National Phase of PCT Patent Application No. PCT/AU2022/050067 having International filing date of Feb. 8, 2022, which claims the benefit of priority of Australia Patent Application No. 2021900304 filed on Feb. 9, 2021. The contents of the above applications are all incorporated by reference as if fully set forth herein in their entirety.

FIELD AND BACKGROUND OF THE INVENTION

This disclosure relates generally to a method and apparatus for handling vehicular components, and in particular, to a method and apparatus for installation and/or removal of a wheel spacer/adaptor, which is part of a vehicle wheel mounting assembly.

Any reference herein to known prior art does not, unless the contrary indication appears, constitute an admission that such prior art is commonly known by those skilled in the art to which the invention relates, at the priority date of this application.

Mining vehicles, such as haul trucks, require the wheels to be removed from time to time for tyre replacement or for maintenance of the wheel mounting assembly. The wheels and various components of the mounting assembly are large and can be difficult to handle and manoeuvre.

For example, the Caterpillar 797 haul truck, manufactured by Caterpillar, Inc., and which is used in high-production mining and heavy construction applications, has a typical overall height of about 15.7 m and a payload capacity of about 400 tonnes. Each 797 truck requires six tyres, each of which is extremely large, being about 4 m tall and weighs about 5300 kg.

The rear axle of the 797 truck supports four wheels, that is, two on either side of the rear of the vehicle. Each outer rear wheel is installed on a removable spacer/adaptor, such that both the outer rear wheel and the spacer/adaptor can be totally removed, to then allow access to the inner rear wheel when required, for example, for repair or replacement of the inner rear wheel.

Not only are the wheels large and cumbersome to handle, but the adaptor/spacer, which is formed of heavy steel or like material, is extremely heavy, and cumbersome to handle when it is installed/removed from the axle.

SUMMARY OF THE INVENTION

The present invention seeks to provide an apparatus and method which assists in the installation and/or removal of a vehicular component, such as, but not limited to, a wheel adaptor/spacer.

When in use, and with reference to the wheel adaptor described earlier, each mounting section is configured so as to be able to be secured to a respective one of the two parts of the wheel adapter which forms a ring. The arrangement is such that the relative movement of the mounting sections, in a direction away from one another, enable the two parts to be separated so that the adaptor can be removed from the housing of the wheel mounting. The relative movement of the mounting section can also be used to facilitate reinstalment of the adaptor onto the housing. When installed, the ring has an axis which parallel to or coaxial with an axis of rotation of a wheel, when mounted to the housing. The relative movement of the mounting sections is in a lateral direction with respect to the wheel rotation axis.

In a broad form, the present invention seeks to provide a vehicular component installation/removal apparatus, including: a height adjustable support structure; a mounting head, including: a longitudinally extendable arm assembly, which is rotatably connected intermediate its ends to said support structure; and, a mounting bracket attached to each end of said longitudinal arm assembly.

Preferably, said support structure includes at least two telescoping members adapted for relative movement relative to one another in a longitudinal direction.

Preferably, said support structure includes a main body drive to longitudinally move said telescoping members.

Preferably, said main body drive includes a linear actuator.

Preferably, said support structure includes a base adapted to be moved over a substrate surface.

Preferably, said arm assembly is rotatably moved about a rotation axis via a rotary drive.

Preferably, said rotary drive includes a linear actuator and a pivotally movable mounting arm.

Preferably, said arm assembly includes a main arm and a pair of telescoping end arm sections.

Preferably, said arm assembly includes an arm drive to telescopically move each telescoping end arm section.

Preferably, said arm drive includes a linear actuator.

Preferably, each mounting bracket is attached to a respective end of said arm assembly via a mounting leg which extends transversely from said arm assembly.

Preferably, each mounting bracket is configured in the form of a V-shaped member.

Preferably, each mounting bracket includes at least one aperture therein which is adapted to be releasably engaged with a vehicular component.

Preferably, each mounting bracket is adapted to be releasably engaged with the vehicular component by an attachment bolt or pin being inserted in said at least one aperture.

Preferably, said vehicular component is a wheel spacer/adaptor.

In a further broad form, the present invention relates to an apparatus for installation/removal of a wheel spacer/adaptor, including: a height adjustable support structure; a mounting head, including: an arm assembly, operatively connected to said support structure, which is longitudinally extendable about a longitudinal axis, and, which is rotatably connected to said support structure about a rotation axis; and, a plurality of mounting brackets extending laterally from said longitudinal arm assembly, configured to be releasably engaged to said wheel spacer/adaptor.

In a further broad form, the present invention provides a method of installing/removing a vehicular component to/from a vehicle, using the apparatus as described hereinabove.

In a further broad form, the present invention relates to a method of installing/removing a vehicular component to/from a vehicle from/to a storage pallet, using the apparatus as described hereinabove.

BRIEF DESCRIPTION OF THE SEVERAL VIEWS OF THE DRAWINGS

Notwithstanding any other forms which may fall within the scope of the method and apparatus set forth in the summary, specific embodiments of the method and apparatus will now be described by the way of example and with reference to the accompanying drawing in which.

DESCRIPTION OF SPECIFIC EMBODIMENTS OF THE INVENTION

Figure 8:
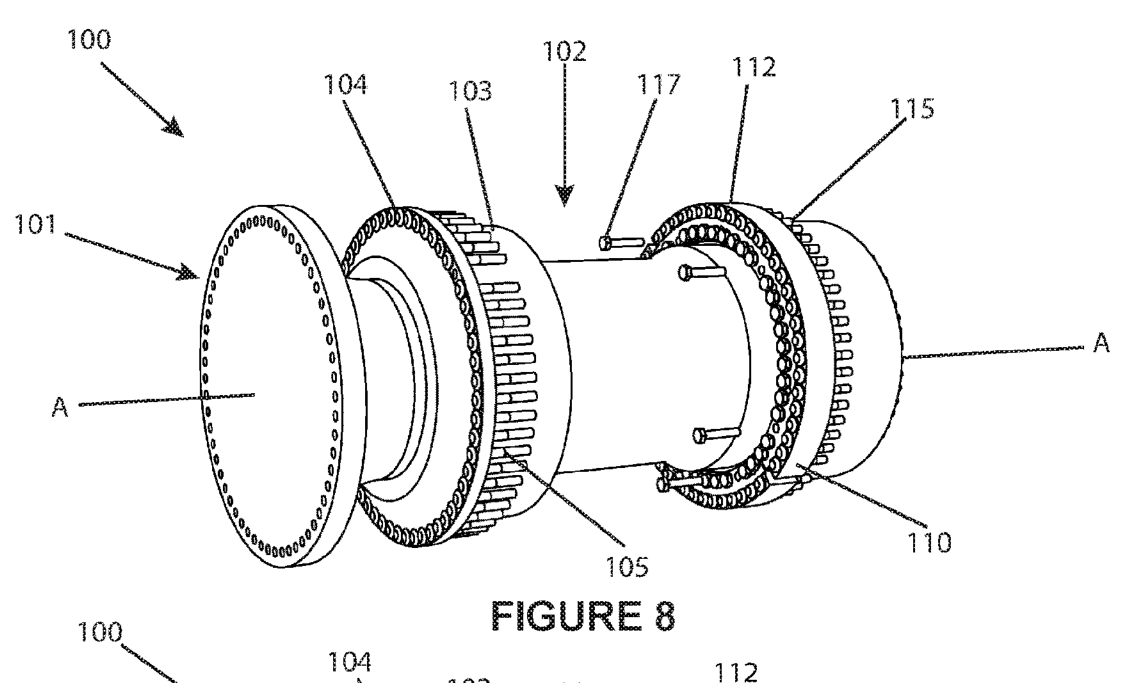
FIGS. 8 to 10 are schematic views of a vehicle wheel mounting assembly with which the apparatus of the disclosure can be used, in various assembly positions.
Figure 9:
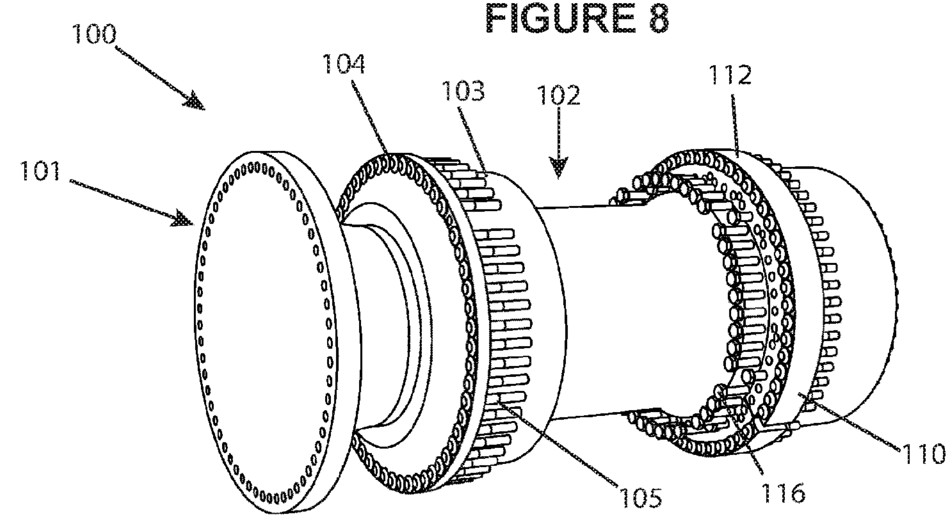
Figure 10:
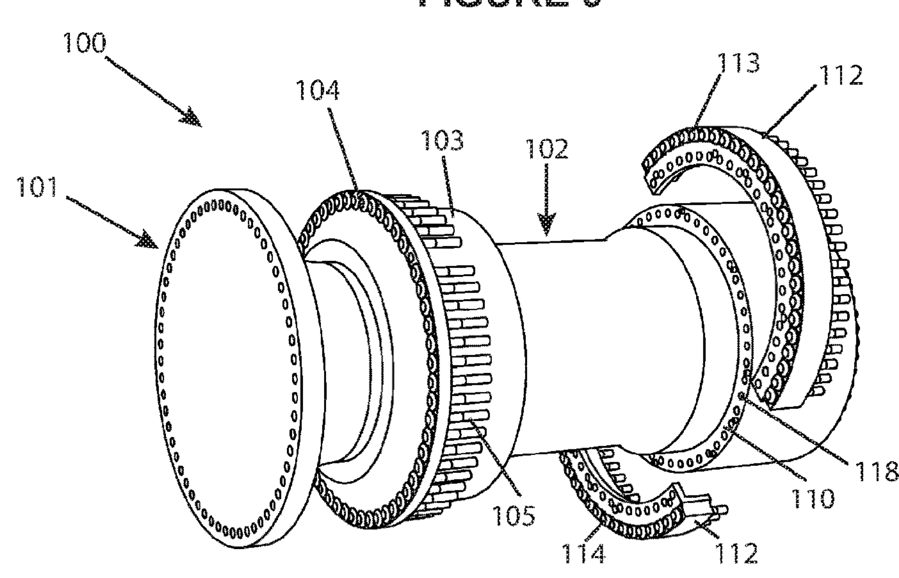

Referring to the drawings, there is illustrated the apparatus, generally indicated by reference numeral 10, for use with a vehicle wheel mounting assembly. An example of a vehicle wheel mounting assembly is illustrated in FIGS. 8 to 10.

An example of a component with which the apparatus is suitable for use is in the form of a wheel adaptor for a vehicle wheel mounting assembly. The assembly may be used in heavy duty vehicles such as mining vehicles such as haul trucks.

The wheel adaptor component can comprise two substantially semi-circular parts which can be fitted together to form a ring or collar which is releasably securable to part of a housing of the vehicle mounting assembly.

Whilst the apparatus is particularly suitable for handling a wheel adaptor of the aforementioned type, reference to this particular application is not to be considered a limitation of the disclosure, as the apparatus is also useful for handling other components and devices.

As shown, the vehicle wheel mounting assembly 100 comprises a support member 101 which is secured to the vehicle body (not shown). The assembly 100 further includes a drive housing 102, operatively connected to the support member 101, for rotation relative thereto about a wheel rotation axis A-A. The drive housing 102 contains the drive mechanism for rotating the housing 102. In this particular arrangement, the housing 102 is adapted to have mounted thereto a dual wheel arrangement including an inner wheel (not shown) at wheel mounting zone 103, and an outer wheel (not shown) at wheel mounting zone 110. A mounting ring or collar 104 is provided at the mounting zone 103. The collar 104 has a series of studs or bolts 105 which extend around the ring or collar 104 to which the hub or rim of the inner wheel is mounted.

The assembly 100 further includes a wheel adaptor component 112 which can be releasably secured to the drive housing 102 at the wheel mounting zone 110 for the outer wheel. The adaptor component 112 comprises first and second parts 113 and 114 which are semi-circular in shape and which together can be secured to the housing 102, so as to form a ring or collar which, in an installed position, extends around the housing 102 at the outer wheel mounting zone 110.

The adaptor component includes a series of studs or bolts 115 for mounting the outer wheel. A further series of studs or bolts 116 are arranged to secure the adaptor component 112 to the housing 102. Temporary attachment bolts or studs 117 are also provided for reasons which will become apparent. The housing 102 further includes a number of dowels 118 which extend through the parts 113 and 114 when installed.

Figure 11:
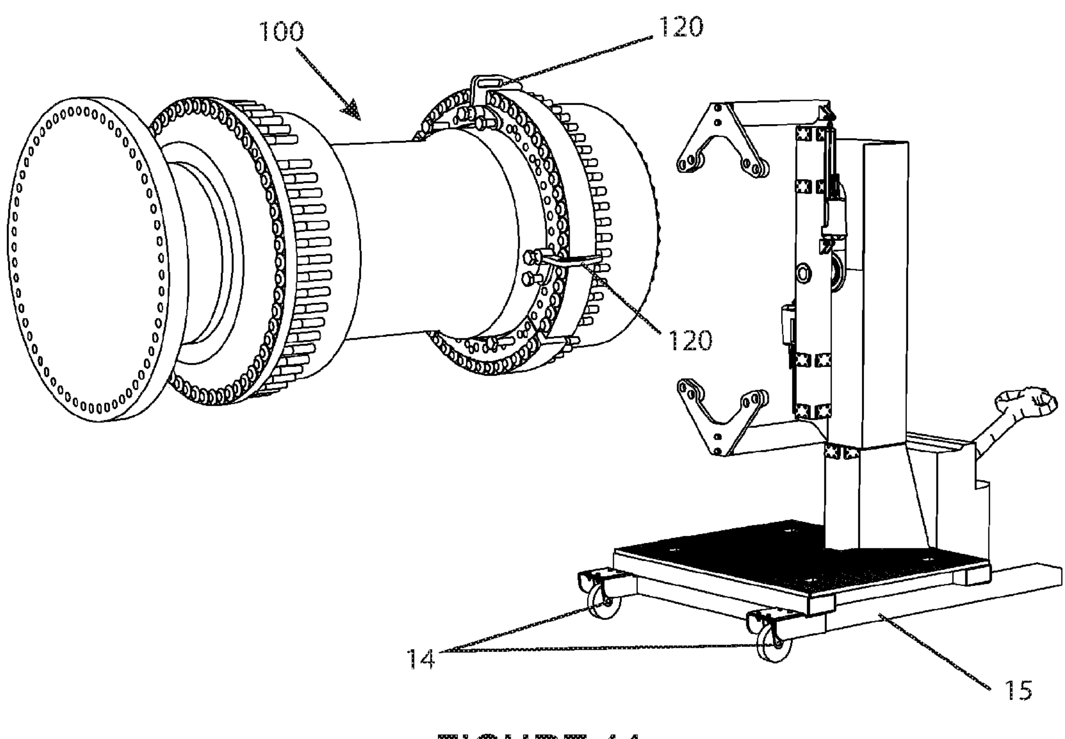
FIGS. 11 to 14 are schematic illustrations of the apparatus when in use.

As shown in FIGS. 1 to 9, the apparatus 10 comprises a main body 11 which includes a base 12 comprised by elongate side members 17 and panels 18. The apparatus may be adapted for movement over a surface for correct positioning when required for use. As shown in FIG. 11, ground engaging elements 14 which may be in the form of wheels or rollers may be connected to the frame 12. The ground engaging elements 14 may form part of a trolley upon which the base 12 can be supported. The ground engaging elements 14 may be powered or freely rotatable for manual movement of the apparatus 10. In another arrangement, the side members 17 may be hollow and least in part, so as to be able to receive the forks of a forklift truck to facilitate movement of the apparatus.

Figure 1:
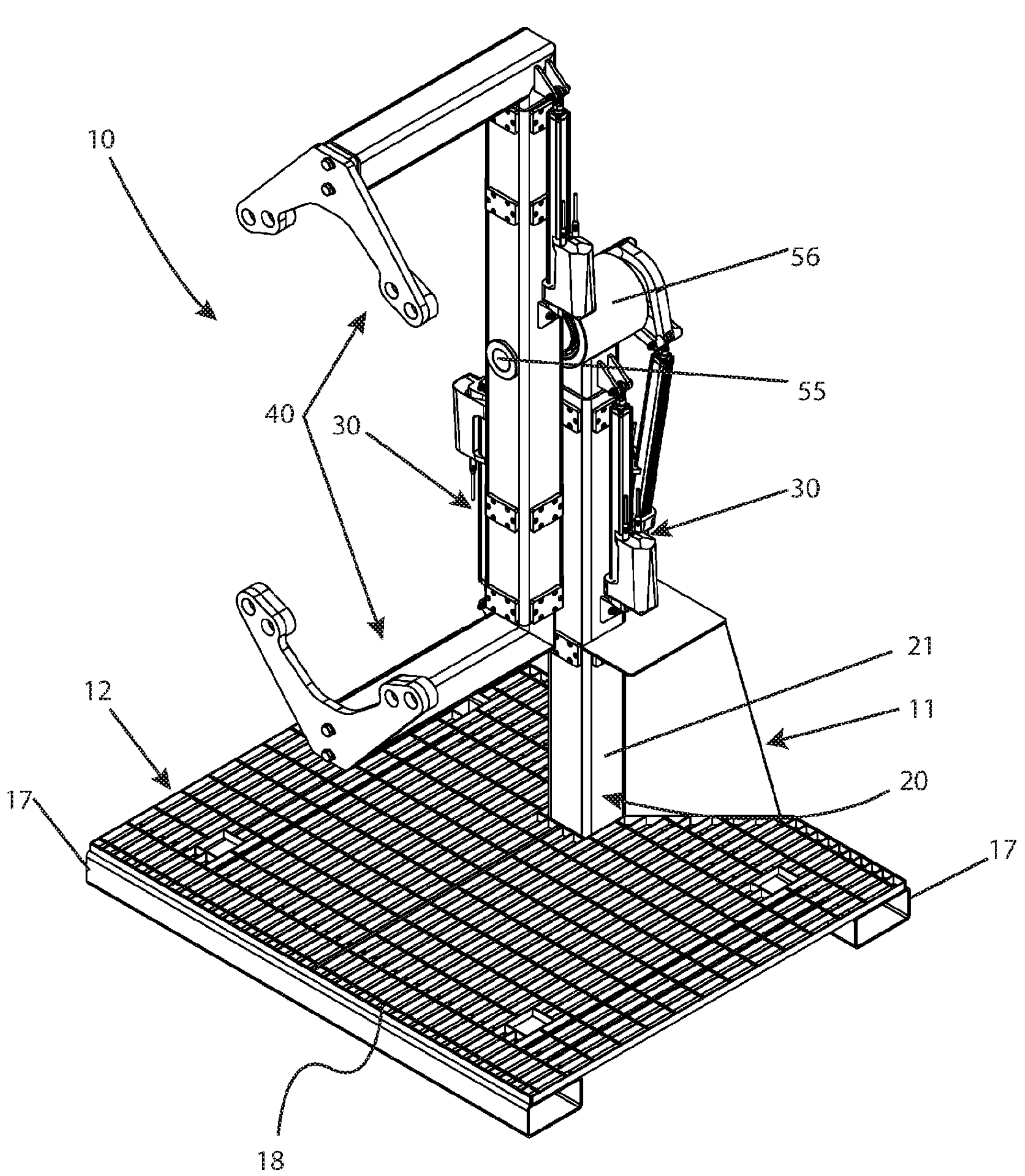
FIG. 1 is an isometric view of the apparatus according to one embodiment, from one side.
Figure 2:
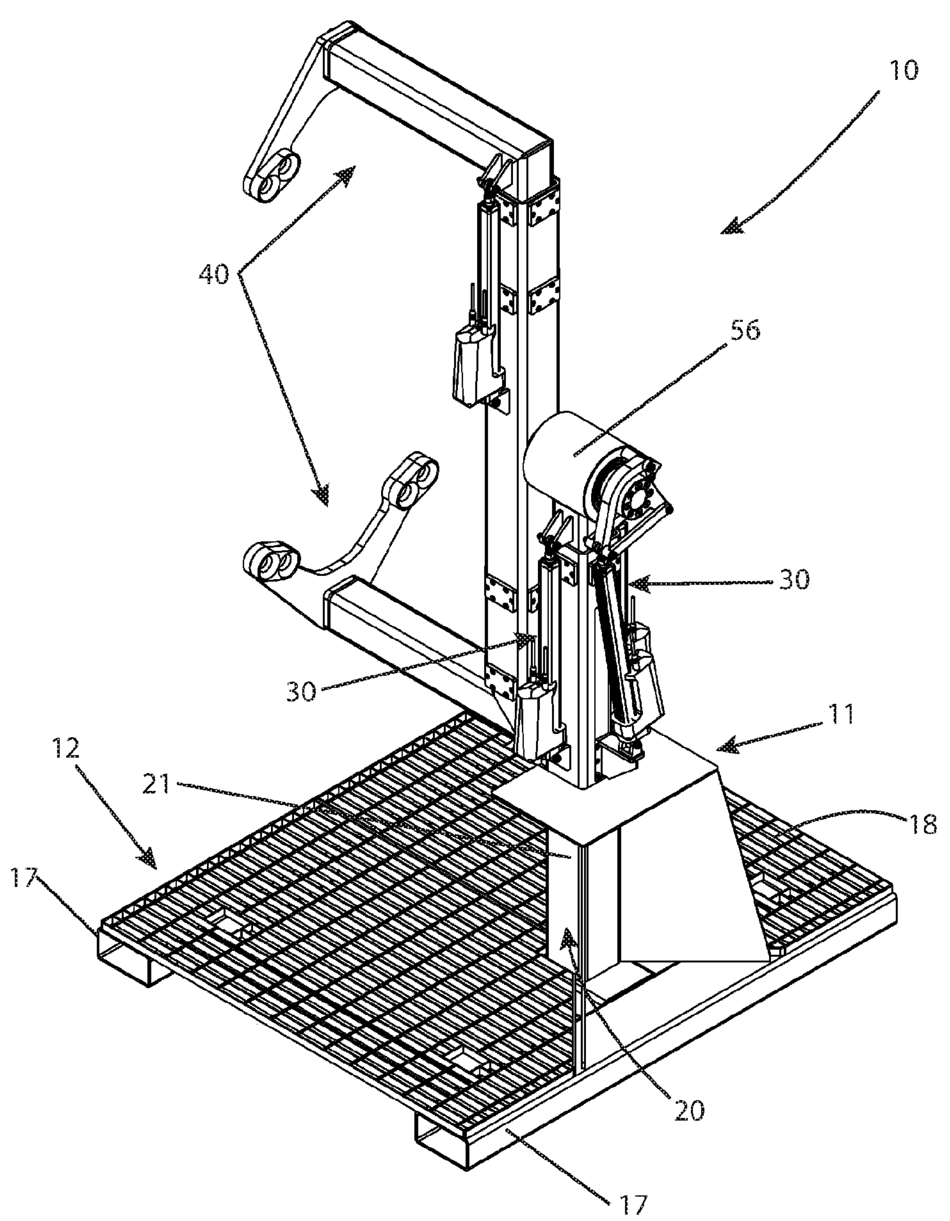
FIG. 2 is an isometric view of the apparatus shown in FIG. 1, from the other side.
Figure 3:
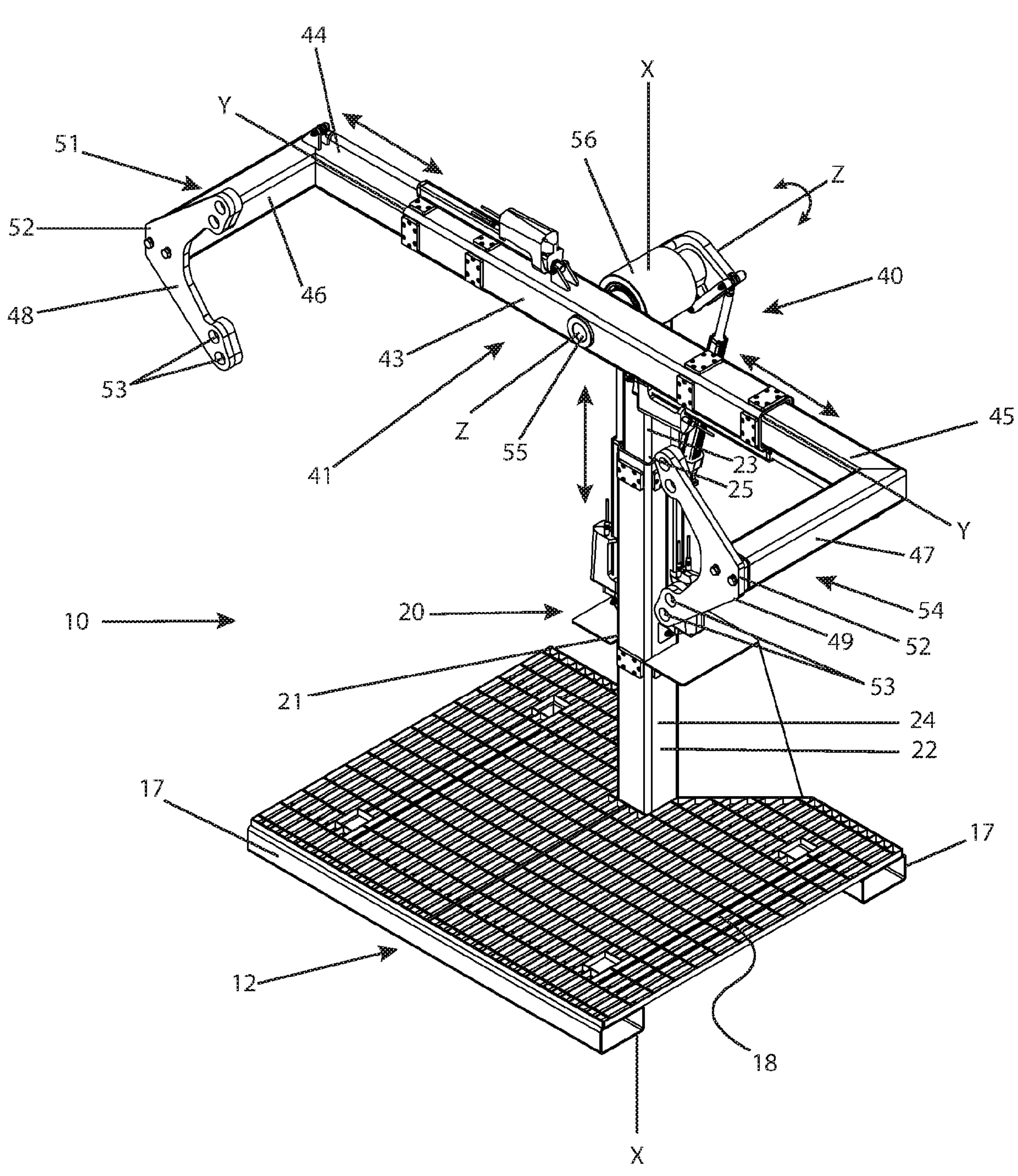
FIG. 3 is an isometric view of the apparatus shown in FIGS. 1 and 2, in a different position.
Figure 4:
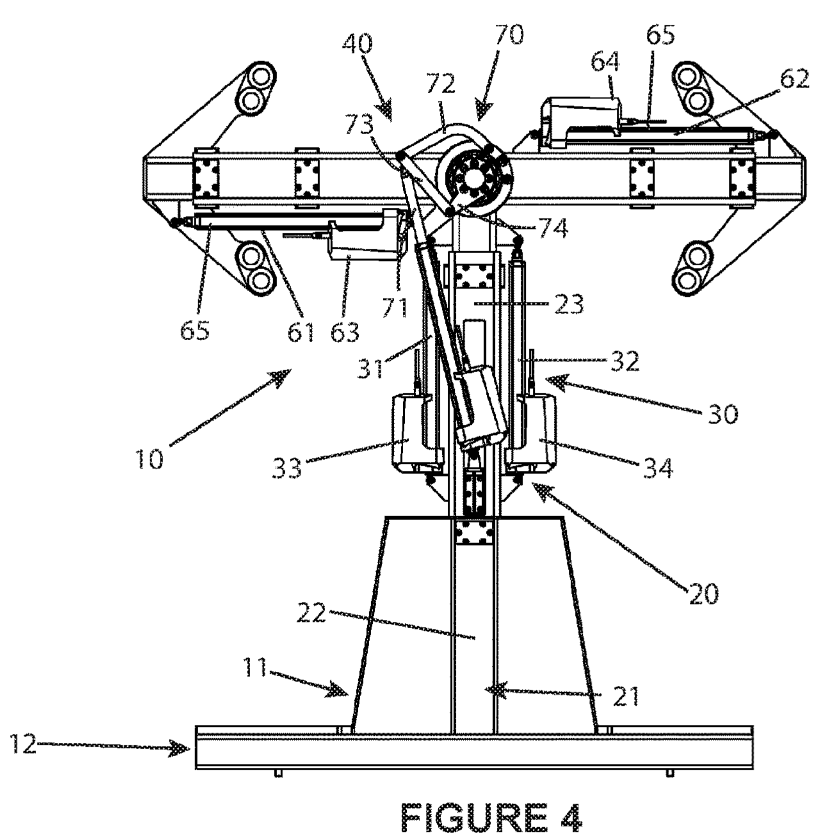
FIG. 4 is an end elevation view of the apparatus shown in FIGS. 1 and 2.
Figure 5:
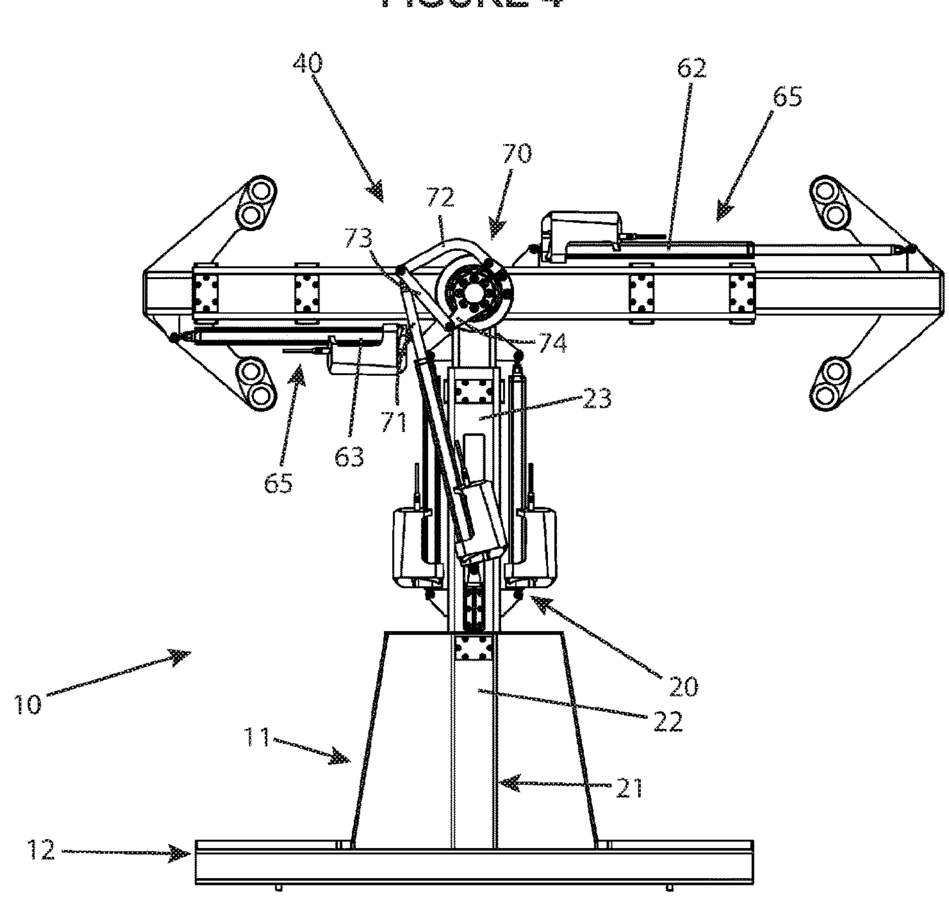
FIG. 5 is a similar end elevation view to that of FIG. 4, but in a different position.
Figure 6:
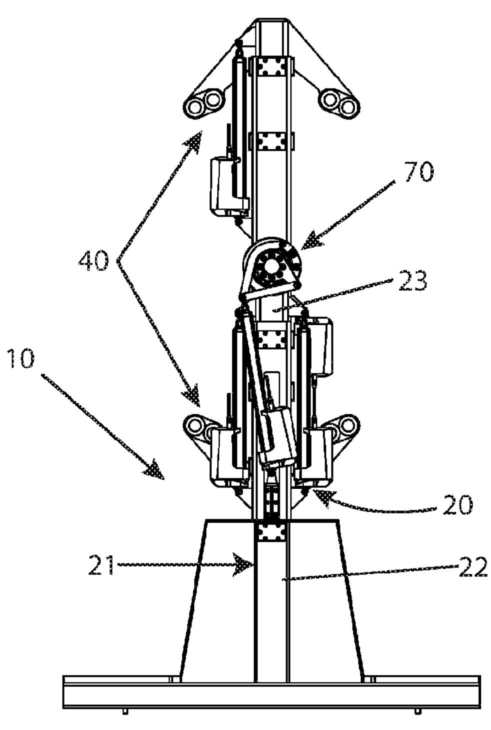
FIG. 6 is a similar elevation view to that of FIG. 5, but in a different position.
Figure 7:
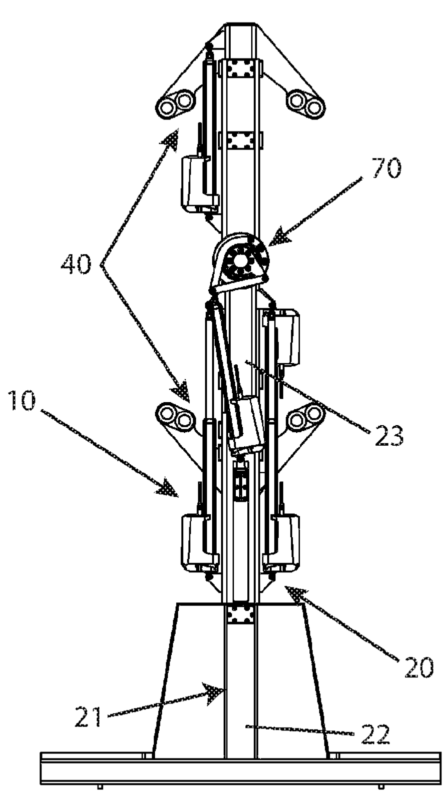
FIG. 7 is a similar elevation view to that of FIG. 6, but in a different position.

The main body 11 of the apparatus further includes a support structure 20 in the form of an upright post 21 having a lower end secured to and extending from the base 12. The post 21 comprises a first or lower part 22 and a second or upper part 23 which are inter-connected so as to be movable relative to one another between extended and retracted positions. To facilitate this, the first and second parts 22 and 23 may be in the form of elongated members 24 and 25 one being receivable within the other in a telescopic fashion so that they can move relative to one another in the direction of longitudinal axis X-X (FIG. 3).

A drive 30 is provided to facilitate the movement (axial movement) between members 22 and 23. As shown, the drive 30 comprises two linear actuators 31 and 32 connected between the members 22 and 23. In the form shown, the actuators 31 and 32 are electric or hydraulic devices driven by motors 33 and 34. A stabilizing section 36 provides stability between the post 21 and base 12.

The apparatus 10 further includes a mounting head 40 operatively connected to the post 21. As shown, the mounting head 40 is secured to the upper end of the upper member 23 of the post 21. The mounting head 40 comprises an arm assembly 41 which includes a main arm 43 operatively mounted to the upper end of the post so as to be rotatable about a rotation axis Z-Z (FIG. 3).

The main arm 43 is secured to the post 21 by means of an axle or shaft 55 and bearing 56. Rotation of the arm assembly 41 is effected by means of a drive 70. The drive 70 includes a linear actuator 71 operatively connected to part of the fixed structure to the apparatus through a pivotally movable mounting arm 72 and a linkage mechanism comprising link elements 73 and 74 operatively connecting the actuator 71 to the axle or shaft 55. FIGS. 4 to 7 illustrate how the drive 70 operates. The actuator 71 may be either electrically powered or hydraulically powered.

As shown, the arm assembly 41 further includes end arm sections 44 and 45 mounted at respective opposite ends of the main arm 43 for relative movement in the direction of longitudinal axis Y-Y (FIG. 3) between extended and retracted positions. The main arm 43 and end arm sections 44 and 45 may be interconnected in a telescopic fashion to enable the relative movement therebetween. A drive 65 in the form of linear actuators 61 and 62 are adapted to effect the movement. Each actuator 61 and 62 has an electric or hydraulic motor 63 and 64 associated there with.

The mounting head 40 further includes mounting sections 51 and 54 operatively connected to respective end arm sections 44 and 45. Each mounting section 51 and 54 includes a connector leg 46 and 47 secured to and laterally extending from respective ends of the arm sections 44 and 45. Each leg 46 and 47 has, at its outer end, a mounting bracket 48 and 49 which are in the form of V-shaped members 52 having locating apertures 53 therein.

To be able to remove the inner wheel from the housing it is necessary to remove the adaptor component 112. The apparatus 10 as described is adapted to facilitate removal and reinstalment of the adaptor component 112 from the housing 102.

The method of use of the apparatus 10 with the wheel mounting assembly 100 referred to earlier will hereinafter be described. This can be understood by particular reference to FIGS. 11 to 14.

As an initial step, temporary attachment bolts 117 are fitted so that they are in a position to allow the adaptors to slide along their length while preventing the adaptor from falling. The remainder of the main adaptor mounting bolts 115 can be removed so that the adaptor 112 is only held by the temporary attachment bolts 117.

Figure 12:
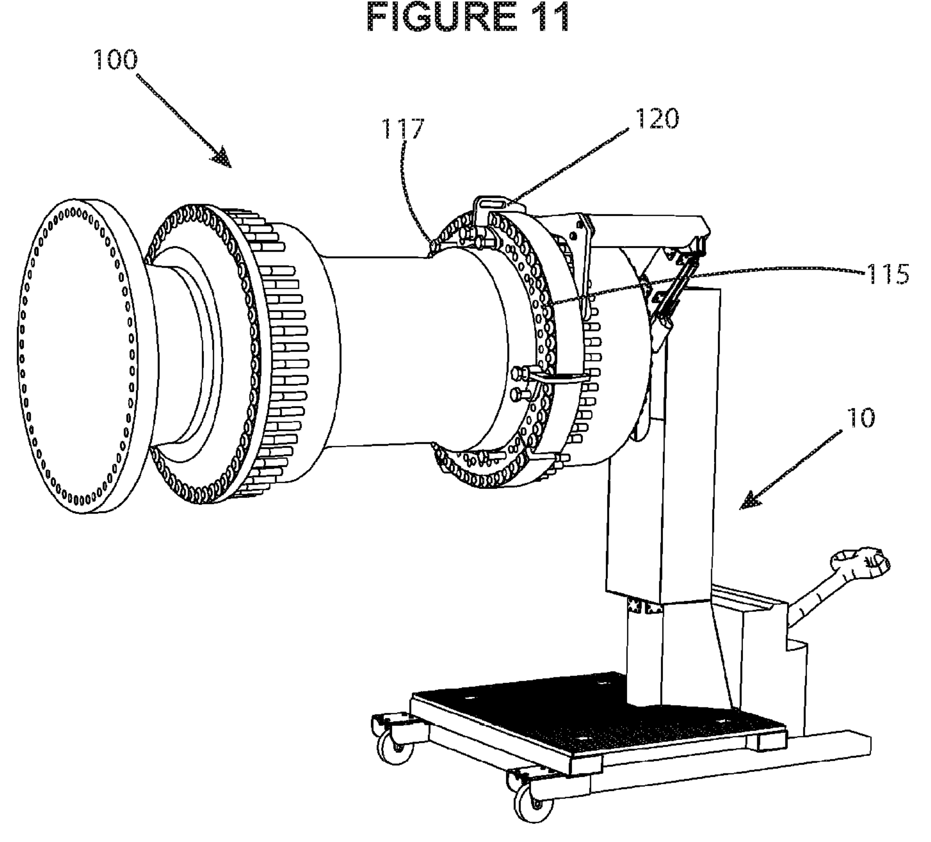

As shown in FIGS. 11 and 12, adaptor dislodgement devices 120 are positioned on the wheel adaptor parts 113 and 114 and the housing 100. As illustrated in FIG. 15, the dislodgement device 120 comprises a U-shaped body 121 which can be arranged to overlie the adaptor 112 and a part of the housing 100. The adaptor 112 may have a tapered body section which fits against a similarly tapered section of the housing when installed. The tapered sections can become difficult to separate from one another. The dislodgement device 120 includes a threaded section 122 which can receive a threaded bolt 123. The threaded section 122 is positioned so as to be aligned with one of the dowels 118 on the housing 102 (the dowels 118 are illustrated in FIG. 10). Rotation of the bolt 123 causes it to react against the dowel 118 so that the adaptor and housing can be dislodged from one another. Once dislodged, the adaptor is retained by temporary bolts only.

The apparatus 10 is then moved into a position adjacent the drive housing 100 with the mounting sections 51 and 54 in an extended position relative to one another so that the mounting head can be moved so that it overlies the drive housing 100. The work head 40 can be rotated if required and the mounting sections 51 and 54 are retracted towards one another so that locating apertures 53 can be aligned with and subsequently fitted to some of the wheel mounting bolts 115. Once the work head 40 is secured to the adaptor 112, the temporary attachment bolts 117 can be removed. The mounting sections 51 and 54 can then be moved into the extended position so that the two parts of the adaptor are separated from the housing 100. The apparatus can then be moved away from the housing 100 with the adaptor 112 being held by the work head 40.

Figure 13:
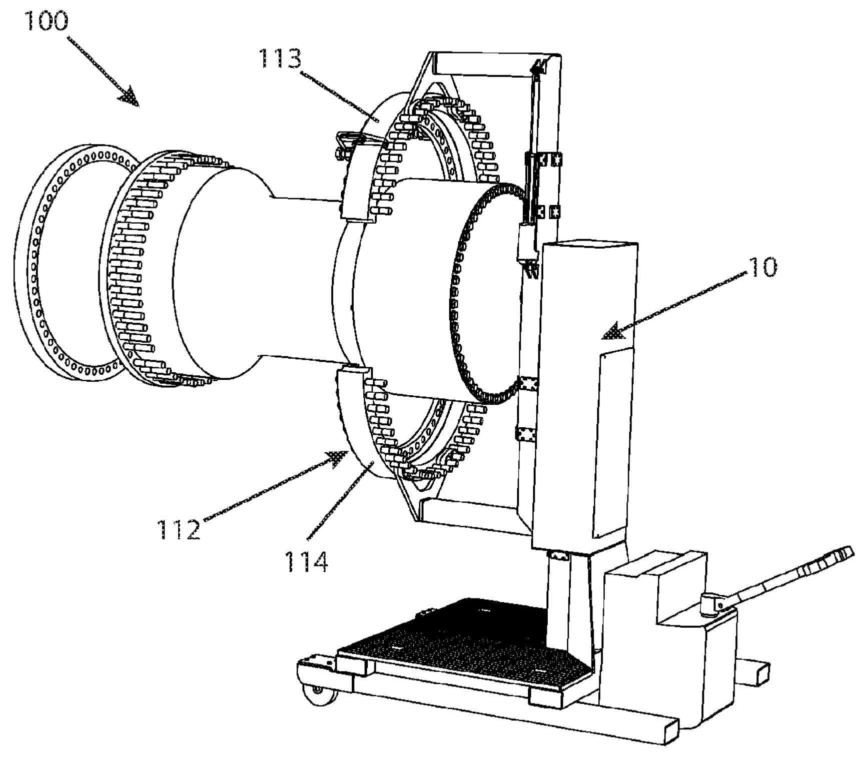
Figure 14:
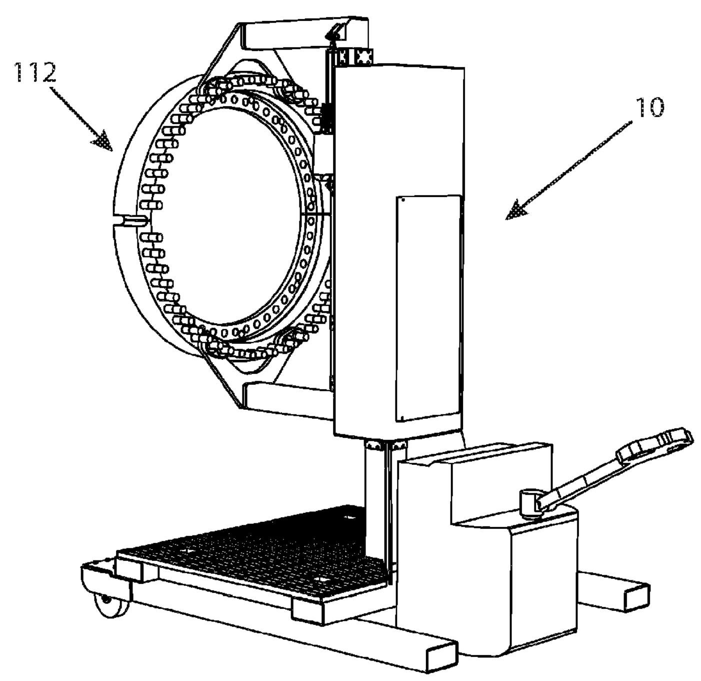
Figure 15A:
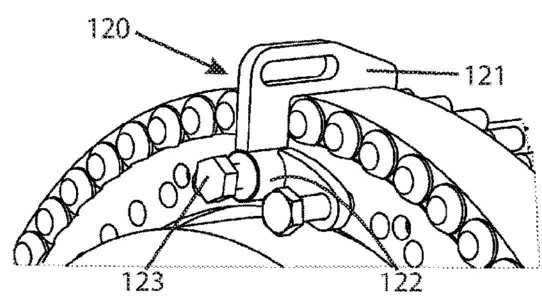
FIGS. 15A, B, C and D are schematic illustrations of a device which can be used with the apparatus.
Figure 15B:
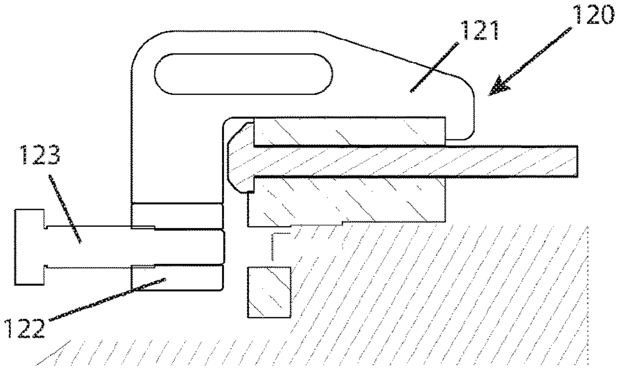
Figure 15C:
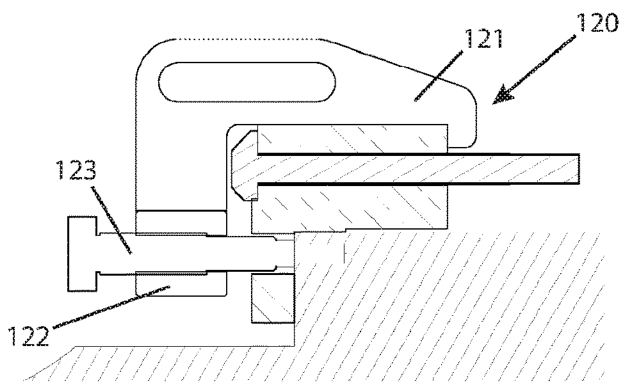
Figure 15D:
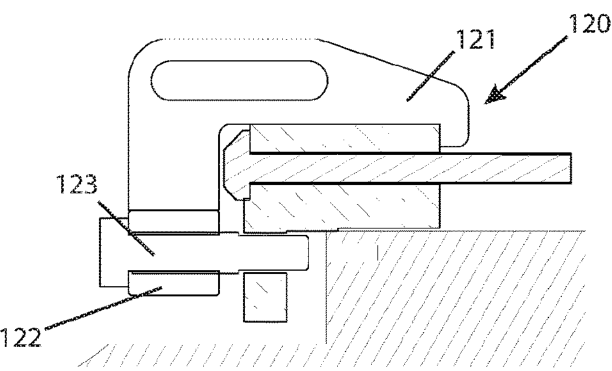
Figures 16, 17:
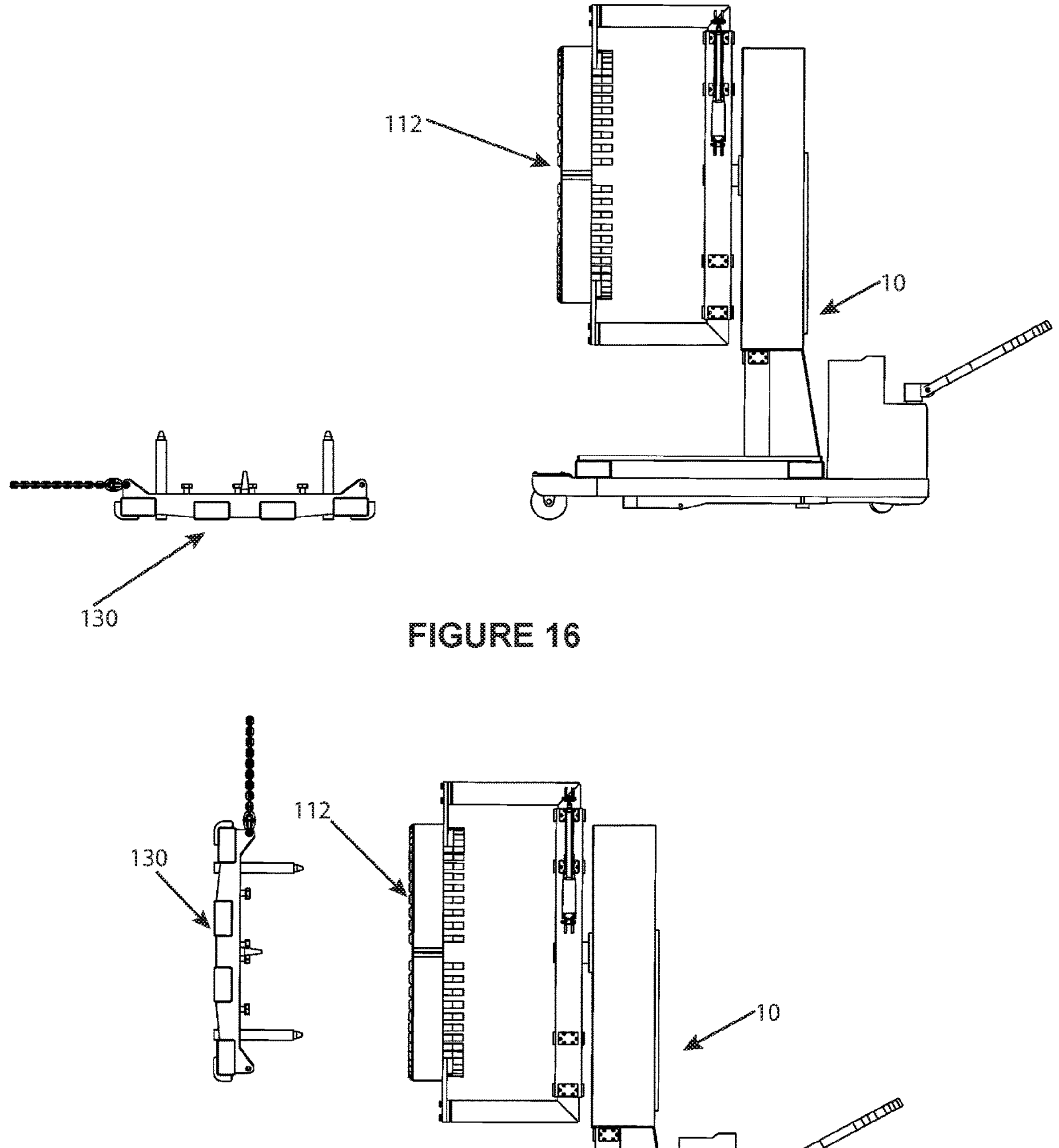
FIGS. 16 to 21 illustrate a procedure for using a pallet to receive and store a wheel adaptor component in conjunction with the apparatus; and, FIG. 22 is a schematic illustration of a pallet which can be used in the procedure shown in FIGS. 16 to 21.
Figure 18:
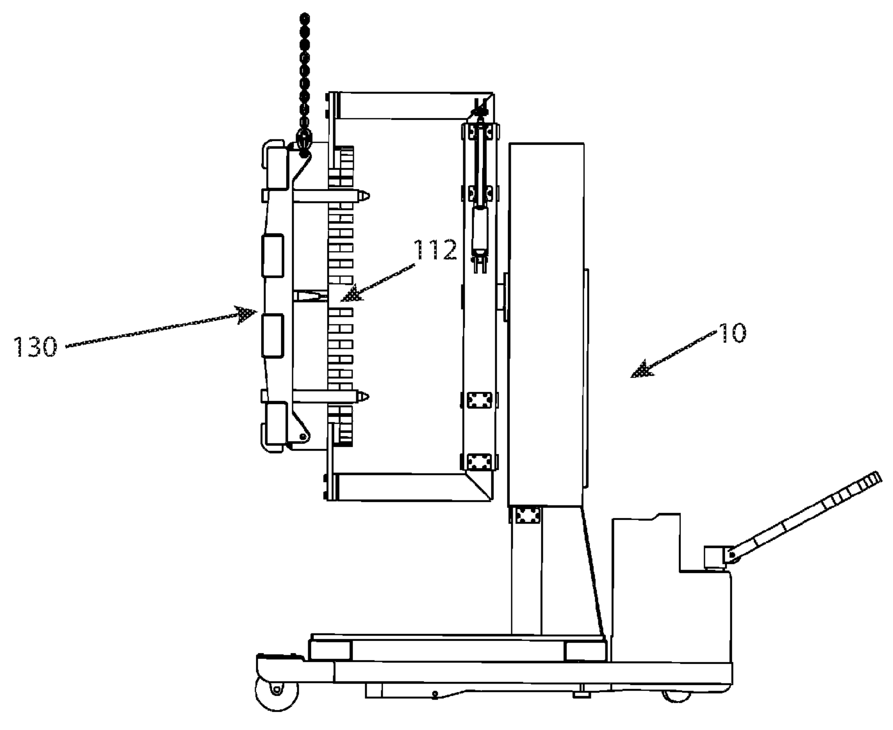
Figure 19:
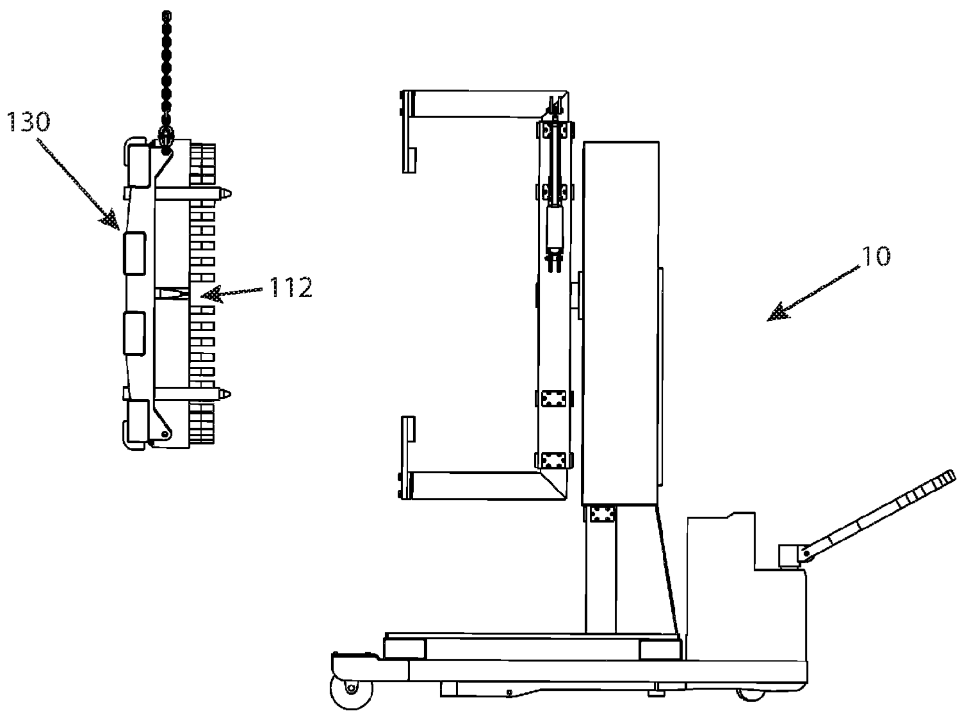
Figure 20:
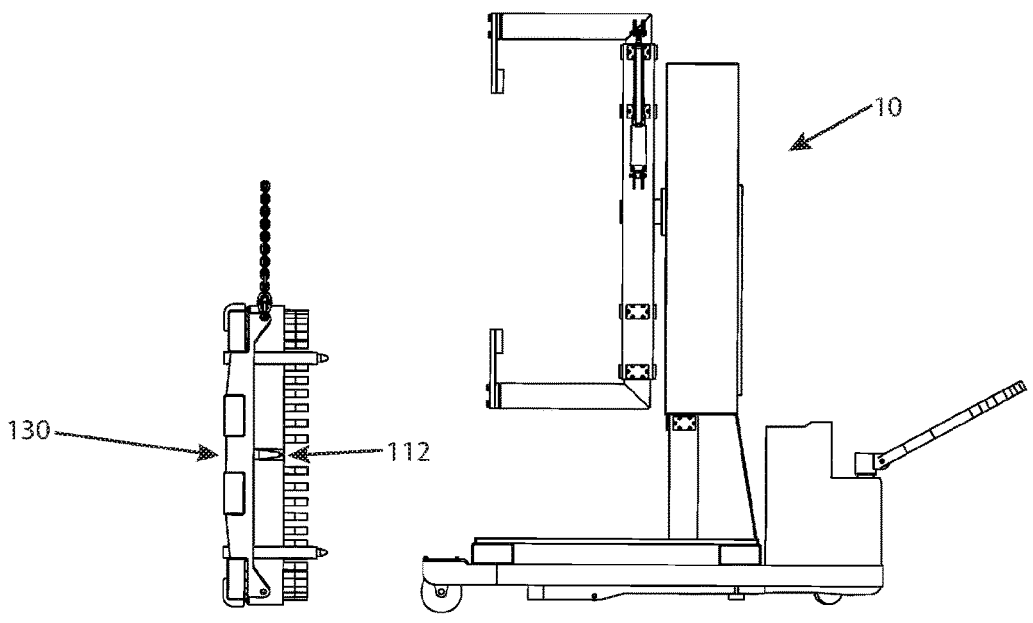
Figure 21:
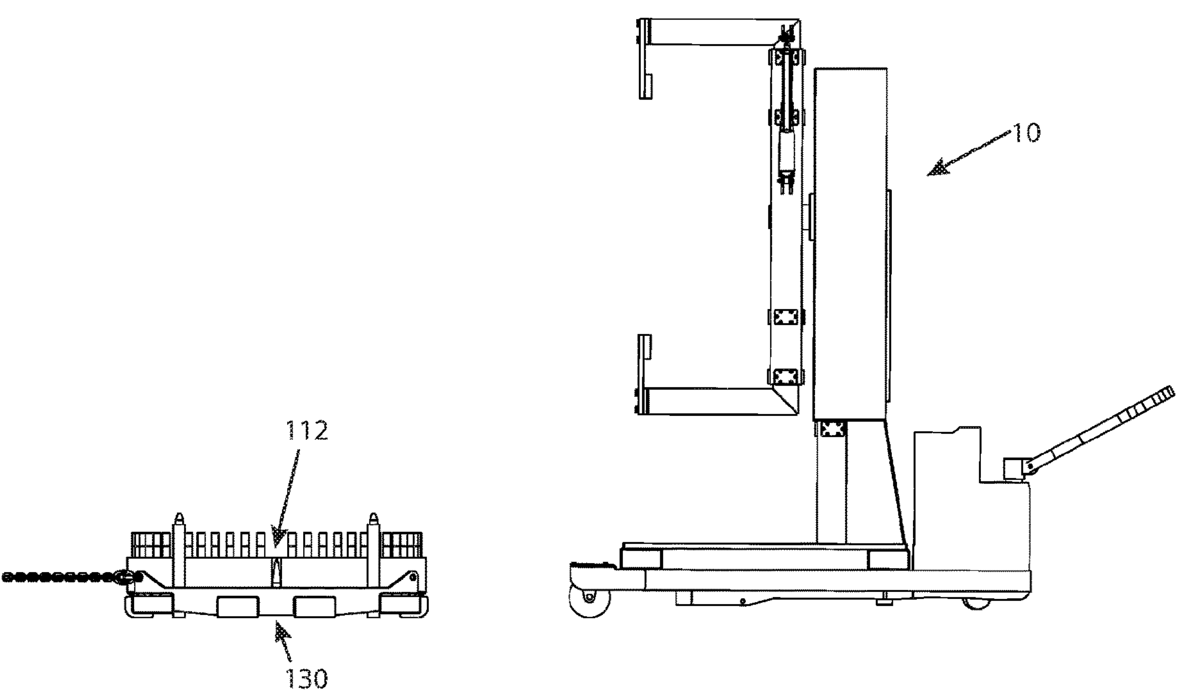

As shown in FIG. 11, the mounting sections 51 and 53 are moved to a position in which they are sufficiently spaced apart to enable the apparatus to be moved into the position shown in FIG. 12 when the sections 51 and 53 can be secured to respective parts 113 and 114 of the wheel adaptor 112. As shown in FIG. 13, the apertures 53 can receive studs 115. Nuts can be used to secure the brackets 48 and 49 to the respective parts 113 and 114.

Figure 22:
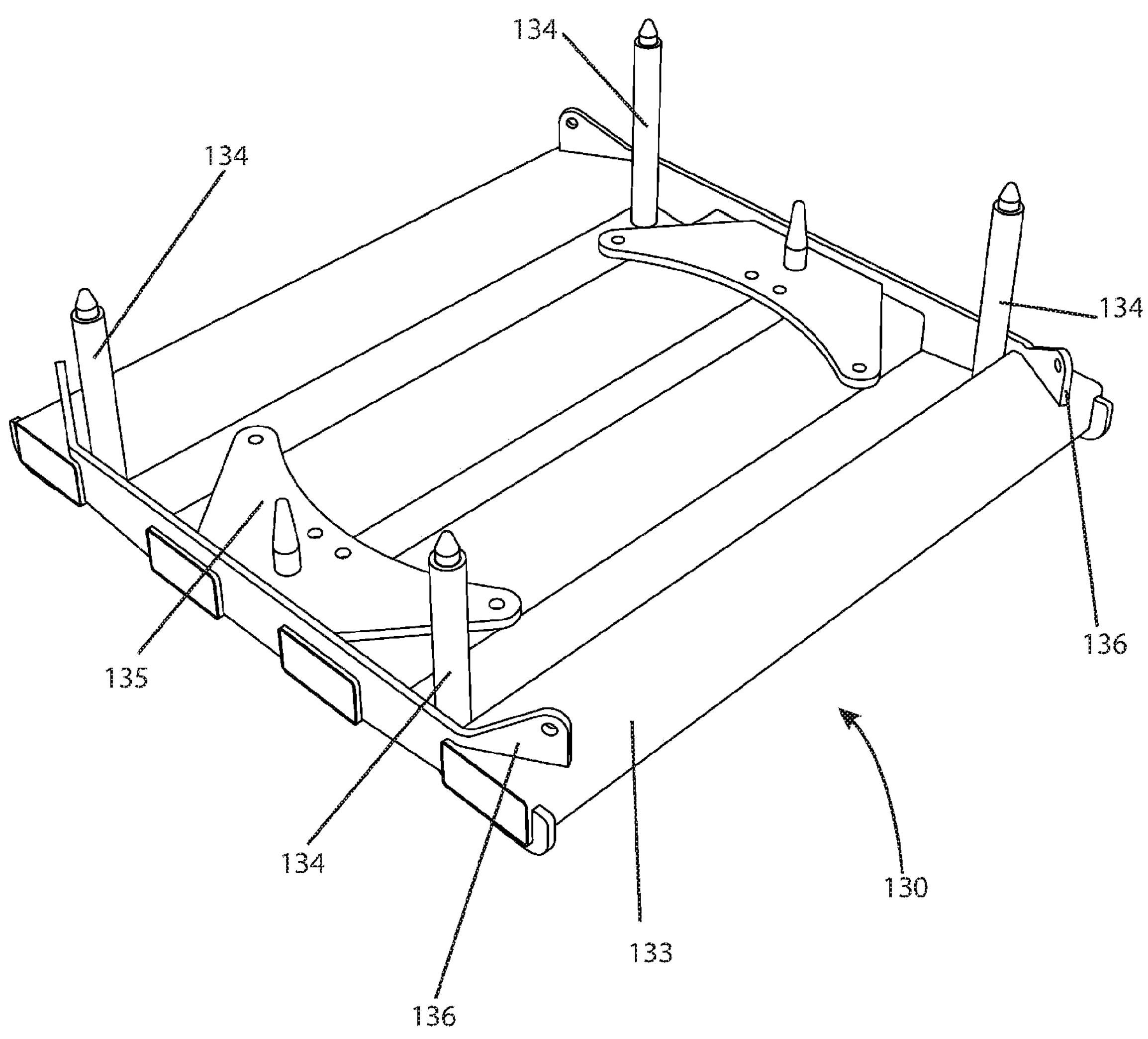

FIGS. 16 to 21 illustrate a procedure for removing the wheel adaptor 112 from or returning it to the apparatus from a storage pallet 130. The storage pallet is illustrated in FIGS. 22 and included a base 133 with a series of corner posts 134 and locating posts 135 extending therefrom. The adapters are mounted through the 8 mounting bolt holes. The posts are adapted to locate and allow the stacking of multiple pallets. As illustrated the pallet 130 can be lifted by a chain connected to a crane or like lifting device to a position where it can be fitted to the wheel adaptor. The pallet and adaptor can then be removed from the apparatus positioned at a storage location.

In the forgoing description of preferred embodiments, specific terminology has been resorted to for the sake of clarity. However, the invention is not intended to be limited to specific terms so selected, and it is to be understood that each specific term includes all technical equivalents which operate in a similar manner to accomplish a similar technical purpose. Terms such as "front" and "rear", "inner" and "outer", "above", "below", "upper" and "lower" and the like are used as words of convenience to provide reference points and are not to be construed as limiting terms.

In this specification the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, addition and/or changes can be made thereto without departing from the scope and spirit of the disclosed embodiments, the embodiments being illustrative and not restrictive.

Furthermore, invention(s) have been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realise yet other embodiments. Further, each independent feature or component of any given assembly may constitute an additional embodiment.

TABLE OF PARTS

| | |
|---|---|
| Apparatus | 10 |
| Main body | 11 |
| Base | 12 |
| Frame | 13 |
| Side member | 17 |
| Cross member | 18 |
| Ground engaging elements | 14 |
| Trolley | 15 |
| Support structure | 20 |
| Post | 21 |
| First part | 22 |
| Second part | 23 |
| First elongated member | 24 |
| Second elongated member | 25 |

TABLE OF PARTS-continued

| | |
|---|---|
| Drive | 30 |
| Linear actuators | 31/32 |
| Hydraulic motors | 33/34 |
| Strut | 36 |
| Mounting head | 40 |
| Arm assembly | 41 |
| Main arm | 43 |
| End sections | 44/45 |
| Mounting sections | 51/54 |
| Connector legs | 46/47 |
| Mounting bracket | 48/49 |
| V-shaped members | 52 |
| Locating apertures | 53 |
| Axle | 55 |
| Bearing | 56 |
| Rotary Drive | 60 |
| Drive | 65 |
| Linear actuators | 61/62 |
| Hydraulic motors | 63/64 |
| Longitudinal axis | X-X |
| Longitudinal axis | Y-Y |
| Rotation axis | Z-Z |
| Dislodgement device | 66 |
| Dowels | 67 |
| Drive | 70 |
| Linear Actuator | 71 |
| Mounting Arm | 72 |
| Link elements | 73/74 |
| Wheel mounting assembly | 100 |
| Support member | 101 |
| Drive housing | 102 |
| Inner wheel mounting zone | 103 |
| Mounting ring or collar | 104 |
| Wheel mounting studs/bolts | 105 |
| Outer wheel mounting zone | 110 |
| Wheel Adaptor | 112 |
| First part | 113 |
| Second part | 114 |
| Wheel mounting studs/bolts | 115 |
| Attachment studs/bolts | 116 |
| Temporary attachment studs/bolts | 117 |
| Wheel rotation axis | A-A |
| Dowels | 118 |
| Dislodgement device | 120 |
| Body | 121 |
| Threaded section | 122 |
| Push bolt | 123 |
| Pallet | 130 |
| Base | 133 |
| Corner posts | 134 |
| Locating posts | 135 |
| Hugs | 136 |

The invention claimed is:

1. A vehicular component handling apparatus, the vehicular component comprising a wheel adaptor which can be installed or removed from a vehicle wheel mounting assembly, the wheel adaptor comprising two separate component parts which together form a ring or collar, when in an installed position, on the vehicle wheel mounting assembly, the apparatus comprising:

(a) a height adjustable support structure;

(b) a mounting head which includes:

(i) an arm assembly having opposed ends with a longitudinal axis extending in a longitudinal direction between the ends;

(ii) the arm assembly being rotatably connected to the support structure in a position intermediate its ends;

(iii) the arm assembly being extendable in the longitudinal direction so that the ends can be moved away from one another; and, (iv) a mounting bracket attached to each end of the arm assembly, each mounting bracket being configured to hold a respective one of the component parts during movement of the ends of the arm assembly away from one another.

2. The apparatus as claimed in claim 1, wherein said support structure includes at least two telescoping members adapted for longitudinal movement relative to one another, so as to adjust the height of the support structure, the mounting head being operatively connected to one of the telescoping members.

3. The apparatus as claimed in claim 2, wherein said support structure includes a main body drive to longitudinally move said telescoping members.

4. The apparatus as claimed in claim 3, wherein said main body drive includes a linear actuator.

5. The apparatus as claimed in claim 1, wherein said support structure includes a base adapted to be moved over a substrate surface.

6. The apparatus as claimed in claim 1, including a rotary drive for causing rotation of arm assembly relative to the support structure.

7. The apparatus as claimed in claim 6, wherein said rotary drive includes a linear actuator and a pivotally movable mounting arm.

8. The apparatus as claimed in claim 1, wherein the arm assembly comprises a main arm and end arm sections at respective opposite ends of the main arm, the end arm sections being connected to the main arm in a telescopic fashion to enable relative movement therebetween in the direction of the longitudinal axis.

9. The apparatus as claimed in claim 8, wherein said arm assembly includes an arm drive to telescopically move each telescoping end arm section.

10. The apparatus as claimed in claim 9, wherein said arm drive includes a linear actuator.

11. The apparatus as claimed in claim 1, wherein each mounting bracket is attached to a respective end of said arm assembly via a mounting leg which extends transversely from said arm assembly.

12. The apparatus as claimed in claim 1, wherein each mounting bracket is configured in the form of a V-shaped member.

13. The apparatus as claimed in claim 1, wherein each mounting bracket includes at least one aperture therein which is adapted to be releasably engaged with a vehicular component.

14. The apparatus as claimed in claim 13, wherein each mounting bracket is adapted to be releasably engaged with the vehicular component by an attachment bolt or pin being inserted in said at least one aperture.

15. The apparatus as claimed in claim 13, wherein said vehicular component is a wheel spacer/adaptor.

16. A method of handling a wheel adaptor that is installable on or removable from a vehicle wheel mounting assembly, the wheel adaptor comprising two separate component parts that together form a ring or collar when installed on the vehicle wheel mounting assembly, the method comprising:

providing a vehicular component handling apparatus comprising:

a height adjustable support structure; and a mounting head including a longitudinally extendable arm assembly rotatably connected intermediate its ends to the support structure, the arm assembly having opposed ends with a mounting bracket attached to each end;

operatively connecting each mounting bracket to a respective one of the component parts of the wheel adaptor;

releasing attachment of the wheel adaptor from the vehicle wheel mounting assembly; and extending the arm assembly in a longitudinal direction to move the mounting brackets away from one another, thereby causing the component parts of the wheel adaptor to move away from one another to remove the adaptor from the vehicle wheel mounting assembly.

17. The method according to claim 16, further comprising:

rotating the arm assembly relative to the support structure to position the wheel adaptor for removal from or installation onto the vehicle wheel mounting assembly.

18. A method of handling a wheel adaptor that is removable from or installable onto a storage pallet, the wheel adaptor comprising two separate component parts that together form a ring or collar, the method comprising:

providing a vehicular component handling apparatus comprising:

a height adjustable support structure; and a mounting head including a longitudinally extendable arm assembly rotatably connected intermediate its ends to the support structure, the arm assembly having opposed ends with a mounting bracket attached to each end;

operatively connecting each mounting bracket to a respective one of the component parts of the wheel adaptor extending or retracting the arm assembly in a longitudinal direction to move the component parts away from or toward one another; and positioning the wheel adaptor on the storage pallet or removing the wheel adaptor from the storage pallet.

* * * * *